O. WUNDER.
RAKING MECHANISM FOR DAMS OR OTHER WATER CHANNELS.
APPLICATION FILED MAR. 22, 1909.
960,613.
Patented June 7, 1910.
2 SHEETS—SHEET 2.
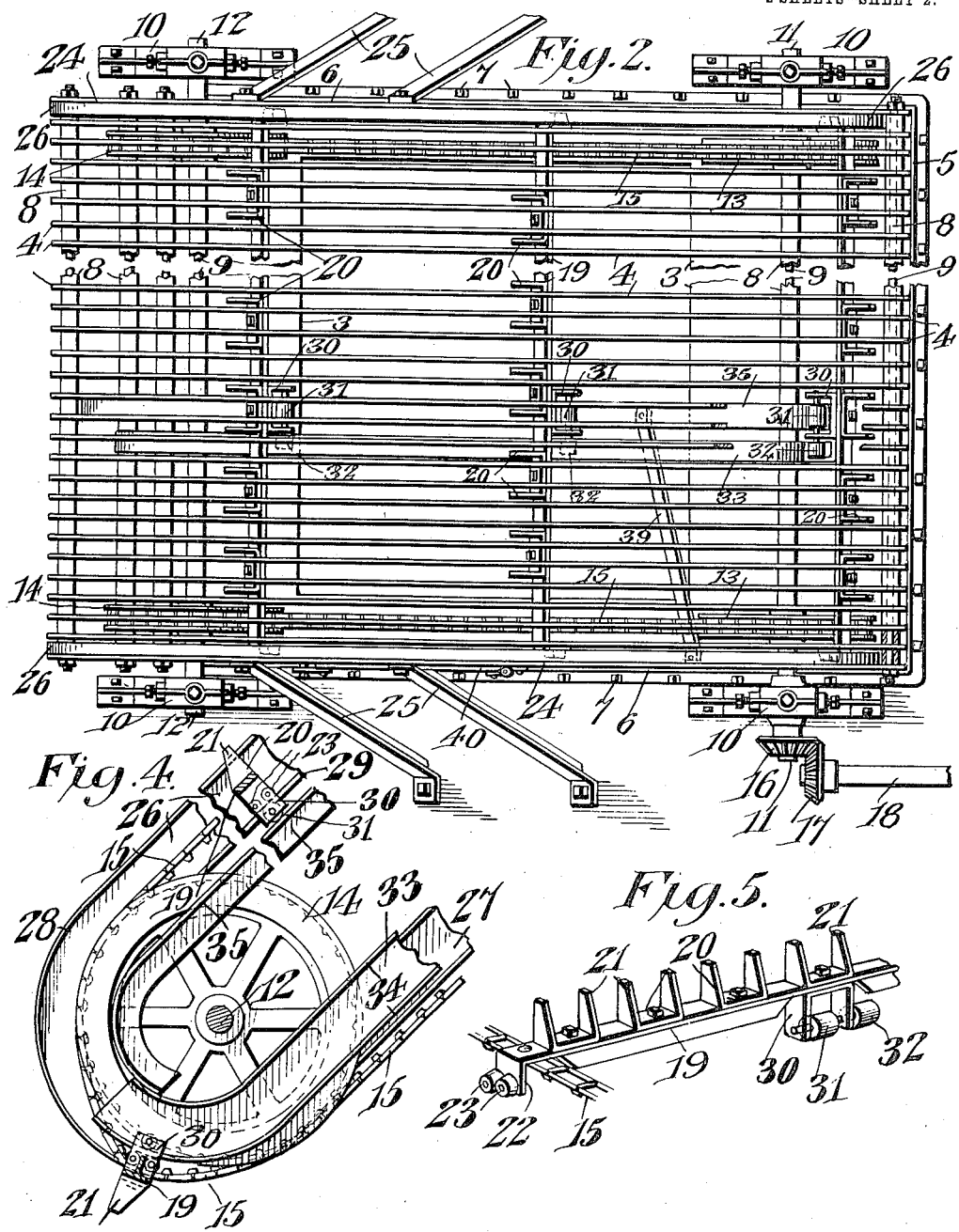
Witnesses
Otto Wunder, Inventor
By
Attorney

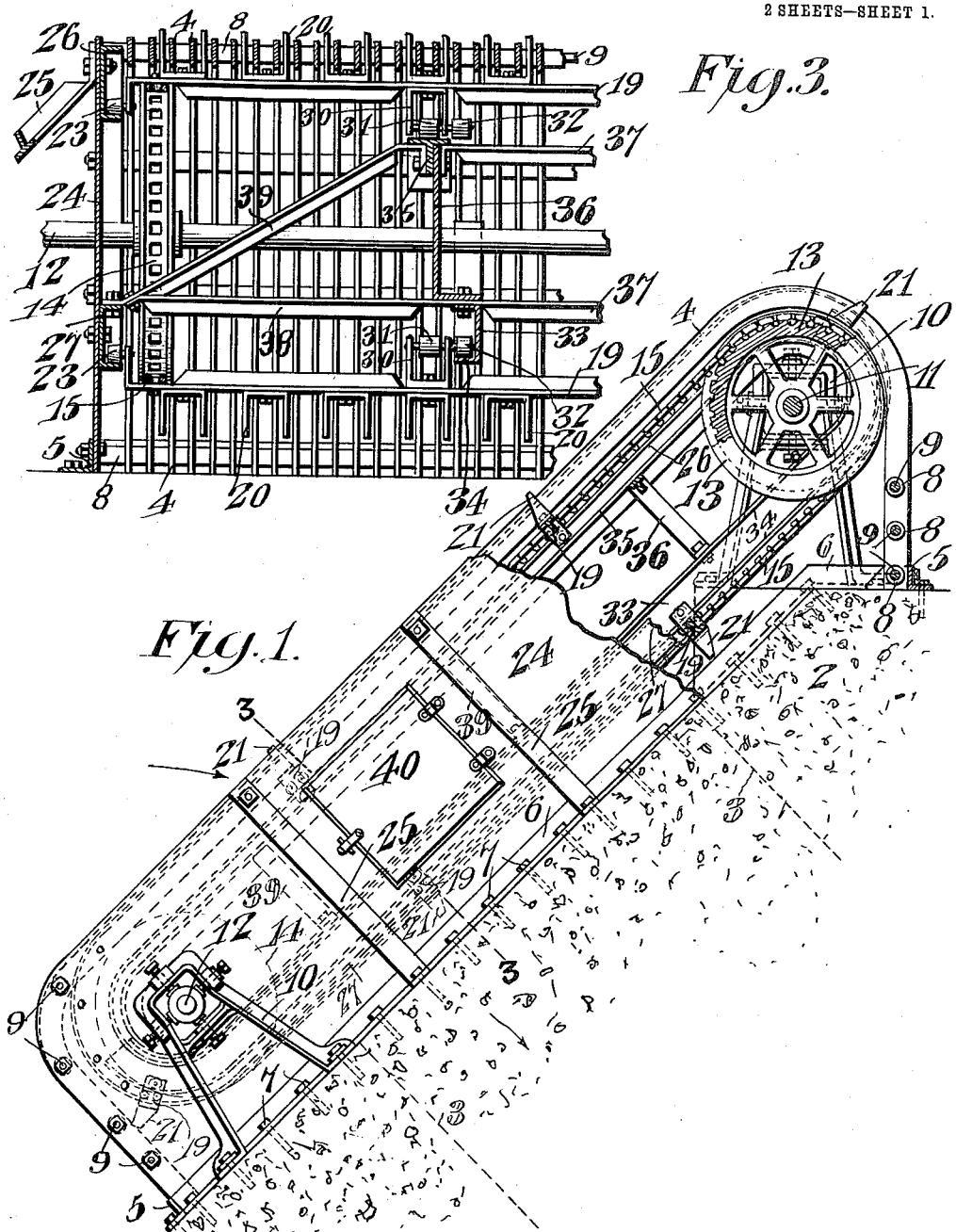

UNITED STATES PATENT OFFICE.

OTTO WUNDER, OF ELLICOTT CITY, MARYLAND.

RAKING MECHANISM FOR DAMS OR OTHER WATER-CHANNELS.

960,613.

Specification of Letters Patent. Patented June 7, 1910.

Application filed March 22, 1909. Serial No. 485,038.

*To all whom it may concern:*

Be it known that I, OTTO WUNDER, a citizen of the United States, residing at Ellicott City, in the county of Howard and State of Maryland, have invented a new and useful Raking Mechanism for Dams or other Water-Channels, of which the following is a specification.

The function of the mechanism herein described is primarily to separate or break into small pieces large masses of packed river mud, timbers, leaves, etc., which have become packed over the openings of ducts or channels in hydraulic dams, mill races, or other like situations where this detritus would otherwise obstruct the free passage of water through the channel, or, if sufficiently small in size, would be forced through the strainer grating protecting the ducts or channels and carried into turbines, chambers, water-wheels or the compartments of water-power machinery. This often causes stoppages and damage to such machinery. A second function of the mechanism is to carry any such lodged masses of detritus away from the duct or channel opening to the top of the dam where the force of water passing over the dam may readily carry them over the same and out of the way.

An embodiment of the invention is shown in the accompanying drawings, wherein—

Figure 1 is a side elevation of my detritus rake, the dam being shown in section; Fig. 2 is a plan view thereof; Fig. 3 is a fragmentary cross section on the line 3—3 of Fig. 1; Fig. 4 is a fragmentary longitudinal vertical section of the lower end of the raking machinery; Fig. 5 is a detail perspective view of a rake bar with its rake teeth and guide rollers.

In its general conception my invention includes a series of parallel grating bars crossing the channel, duct, or other opening, transversely, these bars being preferably upwardly inclined in a vertical plane. Supported beneath the bars is what is practically an endless belt formed with transverse teeth-carrying bars, the teeth of which project through the grating bars. This endless belt is continuously rotated, or rotated whenever the necessity arises for clearing the inner face of the dam or abutment from the detritus. The teeth engage with the detritus, breaking it up or carry it upward against the grating and deposit it upon the crest of the dam or on the other side of the grating, where it can do no damage.

In the embodiment of my invention shown I have illustrated my device as applied to a dam, 2, or other like abutment, having a duct, 3, or other channel therethrough, the direction of water flow being shown by the arrows. Attached to the inner face of the dam and extending across the duct 3, are the upwardly and outwardly inclined grating bars 4, which are parallel with the inner face of the dam. These in the embodiment shown, extend from a point below the duct to the crown of the dam. The ends of the bars are inwardly bent so as to form the legs, to support the lower ends of the bars, and legs to support the upper ends. These legs support the bars 4 a sufficient distance away from the face of the dam to accommodate the endless rake belt between the inner face of these bars and the plane of the inner face of the dam.

The bars 4 constitute a grating. The bars are parallel and extend vertically across the opening 3. At their extremities, the bars 4 are secured to angle irons 5, in the manner shown at the upper end of Fig. 1. Side angle irons 6, parallel the duct 3, and connect with the ends of the irons 5. By means of these irons, 5 and 6, the structure as a whole is held in place by bolts 7, upon the inner face of the dam. At their extremities, the bars 4 are separated by short spacing sleeves 8, through which pass the transverse bolts 9. At the upper and lower ends of the cage formed by the bars 4 are arranged the bearing supports or pillow blocks, 10, of any adequate construction and carrying the journal bearings for the parallel upper and lower shafts 11 and 12. Upon the opposite ends of the upper shaft are mounted the opposed sprocket wheels, 13, while like sprocket wheels 14 are mounted on the lower shaft. Over these wheels pass the endless sprocket chains 15. The shaft 11, which is designed to a large extent to be out of water, if possible, is driven by any suitable gear, as by the bevel gears 16 and 17, and a power shaft 18.

Transversely connecting the sprocket chains 15 at suitable intervals are the rake bars 19. These are riveted or bolted at their ends to the sprocket chains 15. On their outer faces the bars are provided with the outstanding rake teeth 21. These are preferably formed of U-shaped pieces 20, spaced apart on and riveted or bolted to the bars 19 and having their outwardly turned ends suitably shaped to form the teeth 21. The teeth are spaced at regular distances and project between the bars 4. The bars 19 are preferably made of tee iron, as shown in Fig. 1, thus strengthening the bars and preventing any tendency to sag. At their ends the bars 19 are inwardly bent as at 22, and further provided with the laterally projecting rollers 23. These rollers engage with the flanges of upper and lower stretches of channel irons 26 and 27, which are supported on side plates, 24. These plates at their lower edges are bolted to the angle irons 5 and are strengthened by the lateral downwardly and outwardly extending braces 25. The plates close the openings at the sides of the cage or grating between the grating bars and dam, so that sticks, leaves and the like will be prevented from entering the duct or channel 3.

The upper and lower stretches of channel iron 26 and 27 are practically one continuous channel iron, elliptical in form but set eccentrically to the elliptical path of travel of the rake carrying belt formed by the sprocket chains 15 and transverse bars 19. The eccentricity of the combined channel irons 26, 27, is sufficient as shown in Fig. 4 to bring the inner face of the outer flange 28 of the channel iron approximately into coincidence with the plane of travel of the rollers 23, as the rake-carrying belt moves downward along its lower stretch or path of movement so that the rollers 23 are supported on the inner face of the flange 28 during their downward movement. The eccentricity of the channel irons brings the inner flange 29 into coincidence with the path of travel of the rollers 23 upon the upper stretch of the rake carrying belt so that this inner flange supports the belt upon its upward movement. Thus when the rake carrying belt or sprocket chains pass around the lower sprocket wheels 14, the rollers 23 gradually leave their engagement with the outer flanges 28 and engage with the inner flanges 29, and are, hence, supported along the whole line of travel of the belt upon these two flanges.

While with very narrow raking belts where the duct opening 3 is comparatively narrow, it is possible that the lateral supporting channel irons 26 and 27 are all that is necessary, yet it is best to support the rake carrying belt intermediately between the exterior channel irons at one or more places. To this end I provide the bars 19 at intermediate points with the U-shaped roller members 30. The roller 31 is supported between the arms of each of these members and a roller 32 is supported thereon to one side of the roller 31, as shown in Fig. 5, both the rollers being in alinement. A channel iron 33 is supported along the lower stretch of the rake belt with its outer flange 34 in line with the travel of the rollers 32, as shown in Fig. 3 so that during the time the rake belt is traveling downward in its lower stretch from the upper sprocket wheel to the lower, the rake belt shall be supported on the outer flange of the channel iron 33, as well as on the outer flange of the channel iron 27.

Just beneath the upper stretch of the rake belt is a tee iron 35, the upper face of which forms a track on which ride the rollers 31. The irons 35 and 33 are offset in plane as shown in Fig. 3, and are connected by angled bars 36 bolted to the upper flange of the channel iron and the vertical web of the tee iron. The irons 33 are connected by horizontal T-bars which have their terminal ends 38 secured to the channel bars 27, and the upper irons 35 are connected with additional horizontal bars 37 which, together with inclined bracing bars 39 connected with the channel bars 27, and outermost irons 35, firmly brace the irons that support the endless rake. These transverse truss bars therefore form transversely-extending bridges or trusses supporting the tracks 33 and 35. By this construction, whose length and number of tracks depends entirely upon the width of the rake belt, the rake belt is supported intermediately of its side edges and thus sagging is prevented and also frictional engagement between the rake belt and the face of the dam, while the rake teeth are held projected beyond the outer face of the grate bars 4.

As shown in Figs. 1 and 4, the channel iron, 33, only extend partly around the upper and lower turns of the rake belt and the tee iron 35 also extends only partly around the upper and lower turns of the belt. The ends of the two irons 33 and 35, however, overlap so that when the rollers 32 leave the channel iron, the rollers 31 will engage the outer face of the tee iron track 33.

The teeth 21 are of such length that on the upward movement of the rake they project beyond the outer edges of the bars 4, and therefore any material, such as ice, logs, leaves or other detritus, swept against the bars 4, will be engaged by the upwardly-moving teeth, will be prevented from lodgment against the bars and will be carried up and over the bars and deposited upon the crest of the dam where it will be swept away by water passing over the crown of the dam, or the material will be carried completely over the dam and deposited on the outer face of the same, where it will do no damage, the teeth clearing themselves as they move inward and downward on entering the lower path or stretch of the rake belt.

In order to provide for convenient access to the interior of the rake belt, I may form the doors, 40, in one or both of the side plates 24. The shaft 16 may take its power from a turbine, water wheel, or any other prime mover.

While I have shown my mechanism as supported across a duct formed in the masonry of a dam, such a duct as is used to conduct water to a turbine or other hydraulic mechanism, it is to be understood that the upper end of the rake belt, with its driving sprocket wheels, might be supported on bridge work crossing or supported on the crown of the dam itself, the grating acting as a strainer and the moving rake carrying the material up and over the dam. In fact, I do not wish to be limited in the application of my invention to dams properly so called, as it is obvious that this moving detritus carrier might be arranged in a channel of any description, and would act in the same manner to permit the passage of water past the grating bars, while floating detritus would be engaged by the rake teeth, carried up the bars and deposited upon the adjacent bank or in any other desired position. It is obvious also that while I may continuously drive the raking belt, this does not necessarily have to be done, except in periods when there is great likelihood of the channel or duct becoming obstructed as during freshets.

My invention is valuable not only in preventing detritus from entering turbine chambers and other hydraulic mechanisms, but also acts to prevent the lodgment of ice, sticks, logs, etc., upon the inner apron of a dam or wasteway, and the consequent dangerous increase of pressure on the dam might otherwise lead to the destruction of the same.

I have shown what I believe to be the preferred form and application of my mechanism, but it is to be distinctly understood that I do not limit myself to the exact construction shown or the details thereof, nor to the application illustrated.

Having thus described my invention, what I claim as new and desire to secure by Letters-Patent, is:

1. The combination with an abutment having a water channel, of a cage outstanding from and secured to the abutment over the channel thereof, said cage having grating bars extending across the channel and solid side walls for preventing detritus from passing under the bars, and an endless rake mounted in the cage for removing detritus from the grating bars at the exterior of the cage.

2. The combination with an abutment having a water channel, of a cage outstanding from and secured to the abutment over the channel thereof, said cage having grating bars extending across the channel and solid side walls for preventing detritus from passing under the bars, an endless rake mounted in the cage for removing detritus from the grating bars at the exterior of the cage, means for operating the rake, and supports for the rake arranged at the sides of the cage and at points intermediate the sides.

3. The combination with an abutment having a water channel, of a grating or cage secured to the abutment over the entrance end of the channel, an endless rake mounted in the grating for removing detritus from the exterior thereof, supporting and actuating means for the endless rake, endless channels arranged within the grating and supported thereby forming guideways for the rake, and an intermediate guiding and supporting means arranged within the grating at a point between the guideways.

4. The combination with an abutment having a water channel, of a grating or cage secured to the abutment over the entrance end of the channel, an endless rake mounted in the grating for removing detritus from the exterior thereof, supporting and actuating means for the endless rake, endless channels arranged within the grating and supported thereby forming guideways for the rake, transverse trusses in the cage, and guides mounted on the trusses coöperating with the guideways for sustaining the flights of the endless rake.

5. The combination with an abutment having a water channel, of a grating outstanding therefrom and consisting of side walls and parallel grating bars, shafts extending transversely through the grating and out of the side walls thereof, bearings exterior to the grating for the shafts, sprocket wheels on the shafts, endless chains passing around the sprocket wheels, tooth-carrying bars connected with the sprocket chains and movable with their teeth projected between the grating bars, and endless tracks arranged within the grating for supporting the chains between the sprocket wheels.

6. The combination with an abutment having a water channel and a series of parallel grating bars vertically arranged, crossing said channel, the ends of said bars being inwardly turned and engaging with the face of the abutment, of bearings mounted on the face of the abutment at opposite ends of said bars, shafts carried in said bearings, and an endless rake mounted upon said shafts and traveling parallel to said grating bars, said rake having teeth projecting out between the bars and adapted to engage with detritus lodging thereagainst.

7. The combination with an abutment having a water channel and a series of upwardly inclined grating bars crossing said channel, said bars having inwardly turned ends bearing against the face of the abutment and supporting the main portion of the bars in spaced relation thereto, of upper and lower shafts supported on the face of the abutment at the ends of said grating bars, opposed sprocket wheels on each of the shafts, sprocket chains connecting the sprocket wheels, means for driving the sprocket wheels, and transverse rake bars attached to the sprocket chains and having teeth projecting through between the said grating bars and engaging with detritus held thereagainst.

8. In combination with an abutment having a water channel and a series of parallel grating bars mounted thereon and crossing the channel, of an endless rake mounted adjacent to the inner face of the grating bars whose path of movement is parallel with the grating bars, said rake having teeth projecting out between said bars, and endless tracks for supporting both flights of the endless rake along its path of movement.

9. The combination with an abutment having a water channel and a series of parallel grating bars crossing the channel, of opposed pairs of sprocket wheels, sprocket chains connecting the wheels of the opposed pairs, transverse bars carried by the sprocket chains and having U-shaped member forming teeth projecting through between the grating bars, longitudinally extending tracks extending parallel with and adjacent to the upper and lower stretches of said sprocket chains, and rollers attached to the sprocket chains and engaging with said tracks.

10. The combination with an abutment having an inclined face, a water channel extending therethrough, of a series of parallel grating bars crossing the channel and located on the inner face of the abutment, upper and lower pairs of sprocket wheels, sprocket chains connecting the wheels of opposed pairs, transverse bars carried by the sprocket chains and having outwardly projecting teeth extending between the grating bars, rollers carried at the ends of said bars, and elliptical channel irons located on each side of the sprocket chains, having upper and lower flanges forming tracks, said irons being set eccentrically to the path of movement of the sprocket chains in such position that on the lower stretch of the sprocket chain, the rollers on the bars shall ride upon the inner face of the outer flanges, and that on the upper stretch of the sprocket chains, the rollers shall ride on the outer face of the inner flanges.

11. The combination with an abutment having an inclined face and a water channel, of a series of parallel grating bars crossing the channel, and spaced from the face of the abutment, the ends of said bars being inwardly turned and engaging with the face of the abutment, opposed pairs of sprocket wheels mounted between the grating bars and the face of the abutment, sprocket chains connecting the wheels of said opposed pairs, transverse bars carried by the sprocket chains and having outwardly projecting teeth adapted upon the upper stretch of the sprocket chains to project through between the grating bars, rollers carried by the bars intermediate their ends, and tracks mounted between the stretches of the sprocket chains and the bars carried thereby upon which said intermediate rollers ride.

12. The combination with an abutment having a water channel and an inclined face, of a series of parallel grating bars crossing the channel, said bars having at their ends inwardly extending legs which contact with the face of the abutment, opposed pairs of sprocket wheels mounted between the grating bars and the face of the abutment, an endless rake carrier comprising sprocket chains connecting the opposed sprocket wheels, and transverse bars carried by the sprocket chains having teeth adapted to project through between the grating bars upon the upper stretch of the rake carrier, rollers carried by the ends of the bars, elliptical channel bars having upper and lower flanges, said channel bars being eccentrically set to the path of the sprocket chains, the rollers on the ends of the bars engaging with the inner face of the outer flange of each of the channel bars upon the lower stretch of the rake carrier, and with the outer face of the inner flange of said bars upon the upper stretch of the carrier, tracks supported within the opposed stretches of the rake carrier, and rollers mounted on the bars intermediate their ends engaging with said tracks.

13. The combination with an abutment having a water channel, of a series of parallel grating bars crossing the channel and having inwardly turned legs supporting the grating bars in spaced relation to the face of the abutment, opposed pairs of sprocket wheels between the grating bars and the inner face of the abutment, a rake carrier comprising sprocket chains connecting the sprocket wheels and transverse bars carried by said chains and having outwardly projecting teeth, rollers mounted on the ends of the bars, tracks supported adjacent to the sprocket chains with which said rollers engage, a pair of rollers mounted on each transverse bar intermediate of its ends, a channel iron supported within the rake carrier adjacent to the lower stretch thereof, and having upwardly curved ends with the outer flange of which one of each pair of last-named rollers engages, and a track iron mounted within but adjacent to the upper stretch of the rake carrier having downwardly turned ends which overlap the upwardly turned end of said channel iron and with which the other roller of said pair of rollers engages when the bar carrying the rollers has passed beyond the end of the channel iron.

14. The combination with an abutment having a water channel, of a series of parallel grating bars crossing the channel, said bars having inwardly extending legs engaging with the face of said abutment and supporting the grating bars in spaced relation thereto, an endless rake carrier mounted between the grating bars and the face of the abutment and within the inwardly turned end of said bars, said carrier having projecting teeth, which, on the upward movement of the carrier, pass through between the grating bars, and side plates attached to the series of grating bars and closing the lateral openings between the grating bars and the inner face of the abutment.

In testimony, that I claim the foregoing as my own, I have hereto affixed my signature in the presence of two witnesses.

OTTO WUNDER.

Witnesses:
WALLACE H. BROWN,
JOSHUA W. DORSEY.